United States Patent
Hsu

(10) Patent No.: US 9,445,656 B2
(45) Date of Patent: Sep. 20, 2016

(54) HAIR ACCESSORY

(71) Applicant: Shih-Ling Hsu, Tainan (TW)

(72) Inventor: Shih-Ling Hsu, Tainan (TW)

( * ) Notice: Subject to any disclaimer, the term of this patent is extended or adjusted under 35 U.S.C. 154(b) by 0 days.

(21) Appl. No.: 14/587,112

(22) Filed: Dec. 31, 2014

(65) Prior Publication Data

US 2015/0250282 A1 Sep. 10, 2015

(30) Foreign Application Priority Data

Mar. 7, 2014 (TW) .............................. 103108051 A

(51) Int. Cl.
| | | |
|---|---|---|
| *A45D 8/00* | (2006.01) | |
| *A45D 8/36* | (2006.01) | |
| *A45D 8/20* | (2006.01) | |
| *C08L 55/02* | (2006.01) | |

(52) U.S. Cl.
CPC . *A45D 8/36* (2013.01); *A45D 8/20* (2013.01); *C08L 55/02* (2013.01); *A45D 8/00* (2013.01)

(58) Field of Classification Search
CPC ............ A45D 8/00; A45D 8/02; A45D 8/04; A45D 8/06; A45D 8/08; A45D 8/10; A45D 8/12; A45D 8/14; A45D 8/16; A45D 8/18; A45D 8/185; A45D 8/20; A45D 8/22; A45D 8/24; A45D 8/26; A45D 8/28; A45D 8/30; A45D 8/34; A45D 8/36; A45D 8/38; A45D 8/40; A45D 2008/002; A45D 2008/004; A45D 2008/006; A45D 2008/008; A45D 2008/345; A46B 2200/104; A46B 2200/10; C08F 279/04; C08L 55/02; C08L 55/00

See application file for complete search history.

(56) References Cited

U.S. PATENT DOCUMENTS

| | | | | |
|---|---|---|---|---|
| 4,011,639 | A * | 3/1977 | Koleske ................... | A45D 8/24 132/276 |
| 4,549,559 | A * | 10/1985 | Gueret ................... | A45D 24/00 132/219 |
| 2002/0108626 | A1* | 8/2002 | Kimura ................... | A45D 8/20 132/277 |
| 2003/0159245 | A1* | 8/2003 | Harman ................... | G09F 23/06 16/110.1 |
| 2006/0076030 | A1* | 4/2006 | De Laforcade ........ | A45D 19/02 132/142 |
| 2006/0225763 | A1* | 10/2006 | Lau ........................... | A45D 8/20 132/277 |
| 2007/0219019 | A1* | 9/2007 | Matthews .......... | A63B 37/0003 473/351 |
| 2009/0062036 | A1* | 3/2009 | Hebert ............... | A63B 37/0003 473/377 |
| 2009/0194130 | A1* | 8/2009 | Defenbaugh .......... | B82Y 10/00 132/273 |
| 2012/0260935 | A1* | 10/2012 | Lalonde ................... | A45D 8/00 132/275 |
| 2014/0166040 | A1* | 6/2014 | Sze ........................... | A45D 8/26 132/278 |

* cited by examiner

*Primary Examiner* — Robyn Doan
(74) *Attorney, Agent, or Firm* — Alan D. Kamrath; Kamrath IP Lawfirm, P.A.

(57) ABSTRACT

The present invention provides a hair accessory characteristic of Shore Hardness between 41 D and 60 D and made from a polymerized plastic mixture including acrylonitrile-butadiene-styrene (ABS) resin, thermoplastic rubber (TPR), defoamer, lubricant and optical brightener. The hair accessory which is bent and deformed under effect of a tensional stress does not induce white crease marks, cracks or complete breaks and is able to rebounds and returns to initial status after releasing of the tensional stress. The hair accessory with advantages including flexibility, rebound elasticity and plasticity does not compress or hurt a user's scalp and contributes to safety use when the user takes the hair accessory to comb her hairs.

2 Claims, 8 Drawing Sheets

HAIR ACCESSORY

BACKGROUND OF THE INVENTION

1. Field of the Invention

The present invention relates to a hair accessory and, more particularly, to a hair accessory featuring softness, rebound elasticity and plasticity and used in combing, clamping or fixing hairs.

2. Description of the Related Art

In general, topknots, hair clips, hair hoops (hair bands), hairpins or other hair accessories are taken as tools for fixing or binding hairs. In this regard, hair hoops which are easily manipulated by users without complex skills are popular with modern females. A conventional hair hoop is based on a curved lamina made of plastic or metal. Among materials adopted in conventional manufacturing techniques, Acrylonitrile Butadiene Styrene (ABS) resin, Polycarbonate (PC) or Polypropylene (PP) as a single plastic material is preferred by manufacturers in fabrication of hair accessories for characteristics including Shore Hardness over 100D, high rigidity, and less flexibility, rebound elasticity and plasticity. Accordingly, some phenomena like fractures and white crease marks are common in the conventional hair hoop with its both ends pulled toward two different directions by a user, respectively. Furthermore, the conventional hair hoop will be additionally provided with soft sheaths at both ends by a manufacturer because a hair hoop user usually feels tension on both sides of her head. In addition, a hair accessory made from one of those abovementioned single plastic materials such as Acrylonitrile Butadiene Styrene resin, Polycarbonate or Polypropylene for Shore Hardness of 50 D features softness but no rebound elasticity.

BRIEF SUMMARY OF THE INVENTION

Therefore, the primary objective of the present invention is to contrive preferred materials for manufacture of a hair accessory, which has advantages like good flexibility, rebound elasticity and plasticity but no disadvantages including white crease marks and breaks, compared with other materials of conventional techniques in manufacture of a hair accessory which fails in free bending or deformation for an appropriate dimension.

To achieve this and other objectives, a hair accessory of the present invention is made of a plurality of polymerized plastic materials and is characteristic of Shore Hardness between 41 D and 60 D for good flexibility, rebound elasticity, and plasticity. The hair accessory under effect of an external force is foldable and deformable without white crease marks, cracks, or complete breaks and is able to rebound and return to initial status under resilience after releasing of the external force.

In a preferred form, the hair accessory is made of the plurality of polymerized plastic materials including acrylonitrile-butadiene-styrene resin (75%), thermoplastic rubber (20%), defoamer (1.5%), lubricant (1.5%) and optical brightener (2%). The hair accessory of the present invention is derived from the polymerized plastic mixture in which each ingredient accounts for a correct ratio according to the rule of thumb via practical fabrication and experiments.

In an embodiment, the hair accessory is a hair hoop having thicknesses of 1.5 mm to 3 mm, and the hair hoop is provided with a plurality of serrations at an inner side thereof. Furthermore, the hair hoop is made of the plurality of polymerized plastic materials including 75% of acrylonitrile-butadiene-styrene resin, 20% of thermoplastic rubber, 1.5% of defoamer, 1.5% of lubricant, and 2% of optical brightener with 5% tolerance for each individual ingredient respectively.

In another embodiment, the hair accessory is a hair clip including two clamp bodies. Each of the clamp bodies includes a pressing portion bending outward and a plurality of curved combs formed on a bottom of the pressing portion. Two pivoting portions are formed on inner surfaces of the clamp bodies respectively and hinged together. A spring is provided in the pivoting portions for a clamping force supplied to the clamp bodies. Furthermore, the hair clip is made of the plurality of polymerized plastic materials including 75% of acrylonitrile-butadiene-styrene resin, 20% of thermoplastic rubber, 1.5% of defoamer, 1.5% of lubricant, and 2% of optical brightener with 5% tolerance for each individual ingredient respectively.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
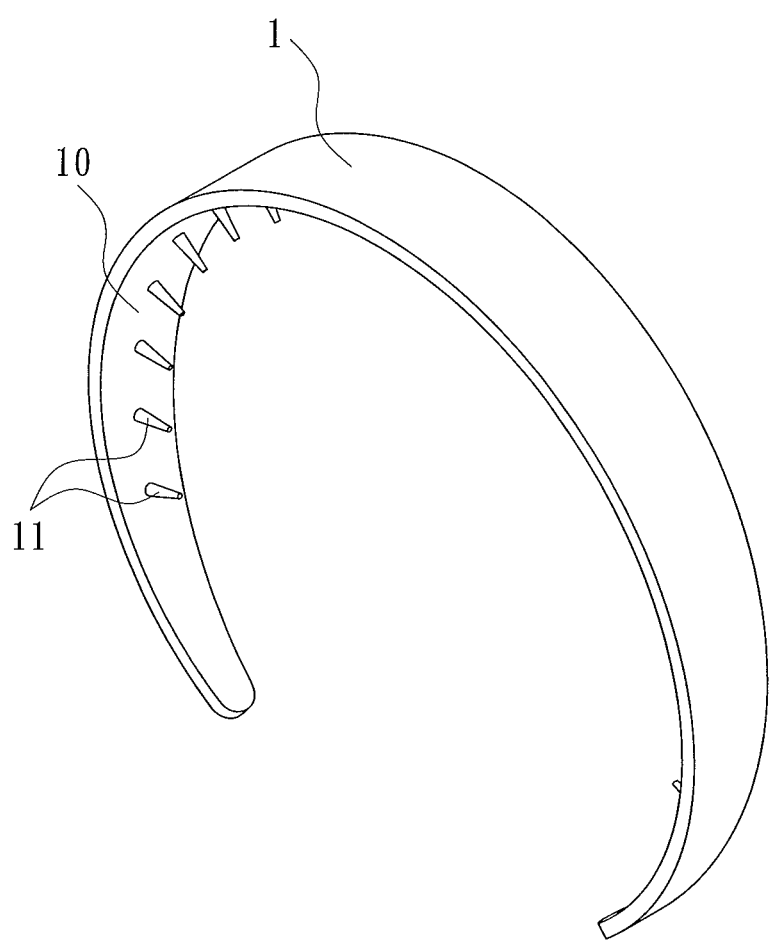
FIG. 1 is a perspective view of a hair accessory according to a first embodiment of the present invention.

FIG. 1 illustrates a plastic hair accessory 1, according to a first embodiment of the present invention. Experiencing lots of material experiments and practical tests, the hair accessory 1 in the embodiment is made of a polymerized plastic mixture including acrylonitrile-butadiene-styrene (ABS) resin (75%), thermoplastic rubber (20%), defoamer (1.5%), lubricant (1.5%), and optical brightener (2%), each of which is based on a specific ratio (an individual ingredient to the total amount) with a tolerance of 5% for development of the polymerized plastic mixture that can be injected into a preset mold and manufactured as the hair accessory 1 in an injection molding process.

The ingredients for manufacture of the hair accessory 1 of the present invention are further introduced hereinafter. The acrylonitrile-butadiene-styrene (ABS) resin is a thermoplastic polymer material characteristic of good strength and tenacity and easily used in plastic molding and processing. The thermoplastic rubber (TPR) or so-called synthetic rubber is extracted from mixed thermoplastic elastomer (TPE) based on a new complex formula in a special manufacture process. The thermoplastic rubber presenting performances of plastics and rubbers is an environment-friendly ingredient which extensively substitutes for other materials including rubber, silicone and latex. During polymerized plastic molding and processing, the defoamer is used in decreasing surface intension, removing any hazardous substances, increasing throughput, reducing material loss, and improving product quality. The lubricant is characteristic of promoting fluidity of a polymerized plastic material consisting of acrylonitrile-butadiene-styrene resin and thermoplastic rubber, increasing speed of injected plastic, enabling a mold cavity full of materials, preventing products from sticking in a mold, and glazing a product's finish. The moderate optical brightener is added into the formula in manufacture of the hair accessory for improving bright white effect. The polymerized plastic mixture consisting of acrylonitrile-butadiene-styrene resin, thermoplastic rubber, defoamer, lubricant and optical brightener is injected into the preset mold in one injection molding process for manufacture of the hair accessory of the present invention which features flexibility, rebound elasticity, bright white effect and environmental benefit without white crease marks.

Figure 2:
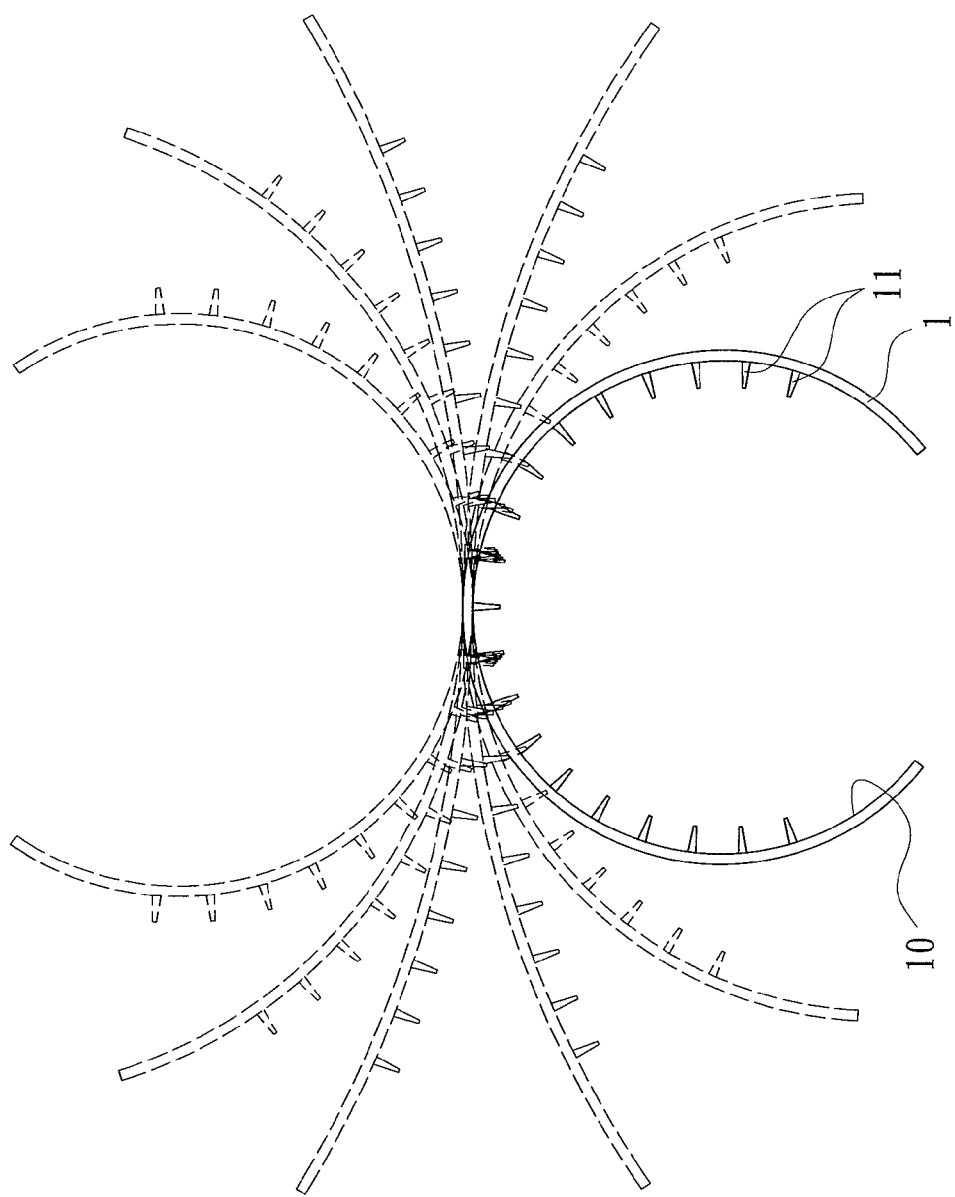
FIG. 2 is a schematic view which illustrates the hair accessory in FIG. 1 is deformed under effect of an external force and is able to rebound again.
Figure 3:
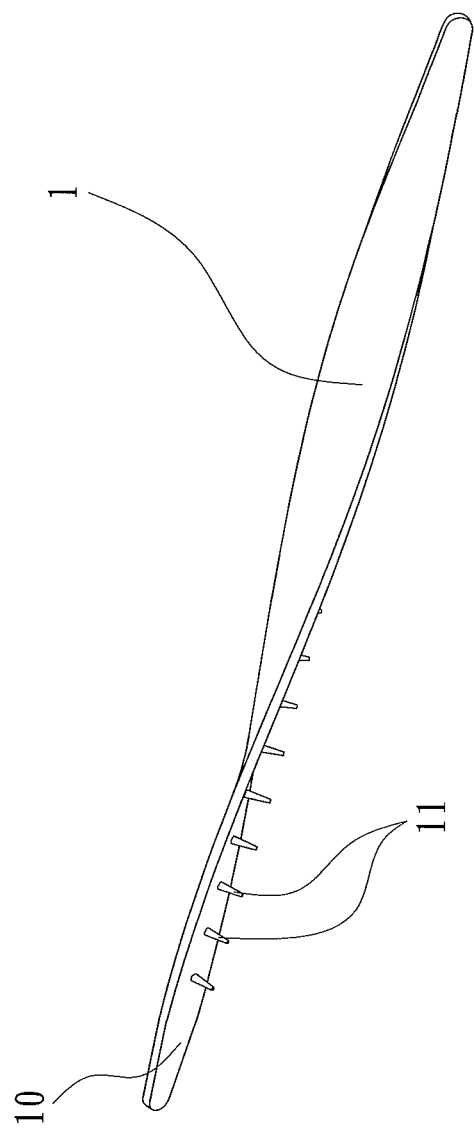
FIG. 3 is a schematic view which illustrates the hair accessory in FIG. 1 with flexibility, elasticity and deformability.

Referring to FIG. 1 through FIG. 3, the hair accessory 1 made from abovementioned materials has Shore Hardness between 41 D and 60 D for good flexibility, rebound elasticity, and plasticity. In this embodiment, the hair accessory 1 of the present invention is a hair hoop with thicknesses of 1.5 mm to 3 mm and having a plurality of serrations 11 on an inner side 10 thereof. The hair hoop 1 under effect of an external force is foldable and deformable without white crease marks, cracks, or complete breaks. Furthermore, the hair hoop 1 is able to rebound and return to initial status under resilience of the aforesaid polymerized plastic mixture after releasing of the external force, as shown in FIG. 3.

In addition, the inner side 10 of the hair hoop 1 used in combing hairs abuts a hair hoop user's hairs but does not compress or hurt her scalp because of flexibility, rebound elasticity, and plasticity of the hair hoop 1 for safety use.

Figure 4:
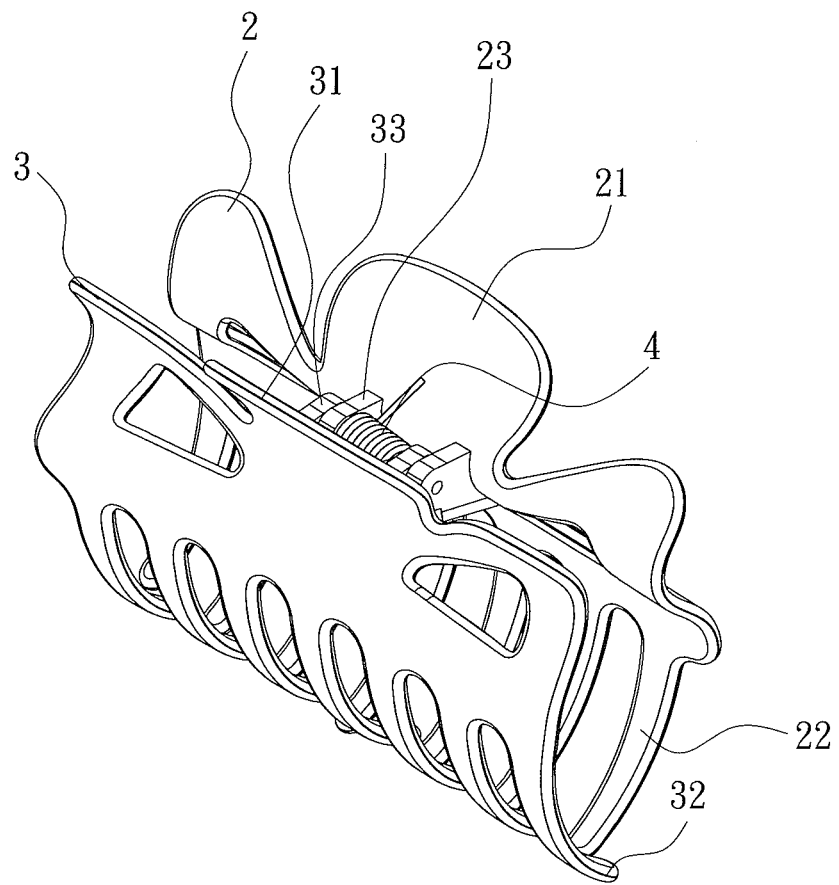
FIG. 4 is a perspective view of a hair accessory according to a second embodiment of the present invention.
Figure 5:
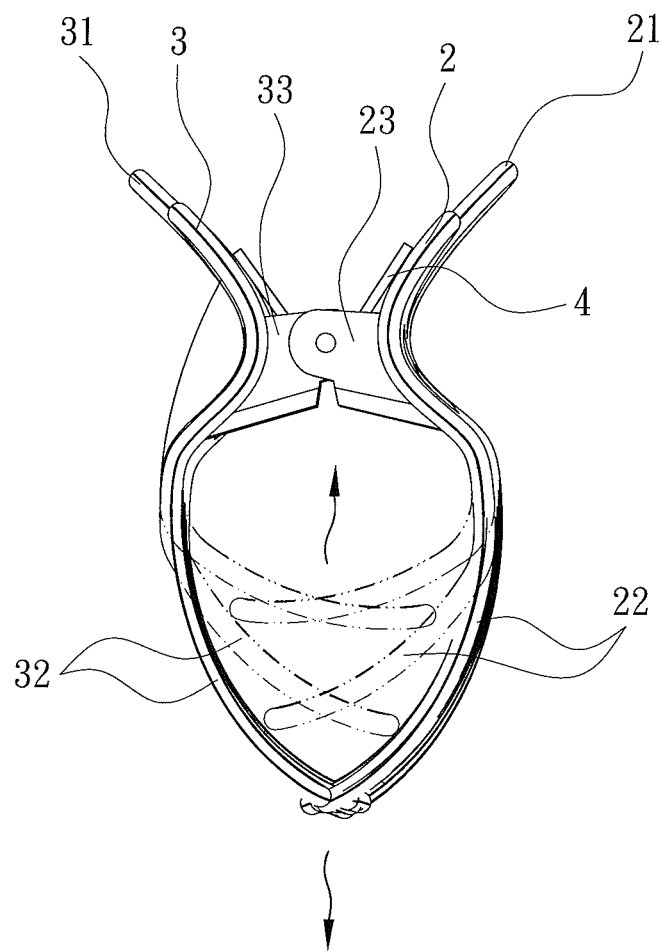
FIG. 5 is a schematic view which illustrates the hair accessory in FIG. 4 is deformed under effect of an external force and is able to rebound again.

FIGS. 4 and 5 illustrate the hair accessory of present invention which is used as a hair clip and includes two clamp bodies 2, 3. The clamp bodies 2, 3 respectively include pressing portions 21, 31 bending outward and a plurality of curved combs 22, 32 respectively formed on bottoms of pressing portions 21, 31. Two pivoting portions 23, 33 are respectively formed on inner surfaces of the clamp bodies 2, 3 and are pivotally fitted to each other. Each of the clamp bodies 2, 3 is made of the aforesaid polymerized plastic mixture including acrylonitrile-butadiene-styrene resin, thermoplastic rubber, defoamer, lubricant and optical brightener. A spring 4 is provided in pivoting portions 23, 33 and supplies a force by which the combs 22, 32 of the two clamp bodies 2, 3 clamp each other. When the hair clip 1 is used to set hairs, the clamp bodies 2, 3 in which a tuft of hairs are held are bent and deformed under effect of a tensional stress. However, neither white crease marks nor cracks are observed on the combs 22, 32 of the deformed hair clip 1 which is made from the aforesaid polymerized plastic mixture based on the ratios. Moreover, neither a user's scalp pressed by the hair clip 1 nor hairs fixed by the combs 22, 32 are hurt or damaged. In addition, the combs 22, 32 which is bent or deformed while sustaining an external force can be returned to their original positions under resilience of the aforesaid polymerized plastic mixture when the external force is released (see FIG. 5).

Figure 6:
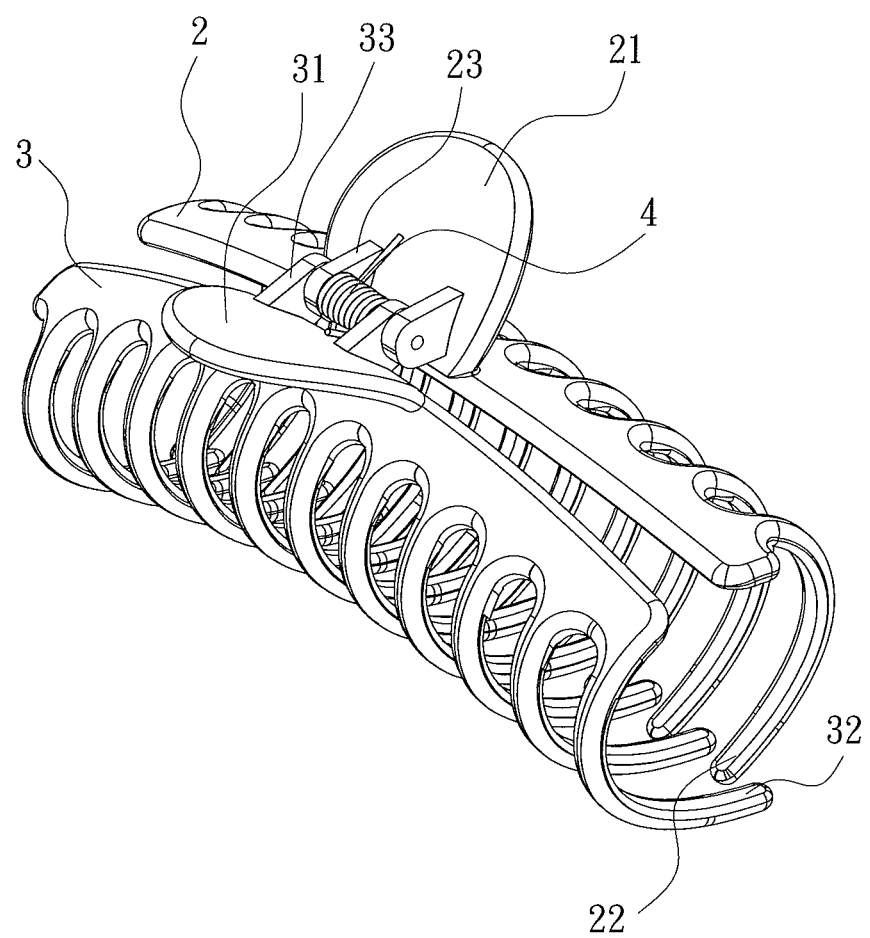
FIGS. 6 through 8 are perspective views illustrating hair accessories in three other embodiments of the present invention.
Figure 7:
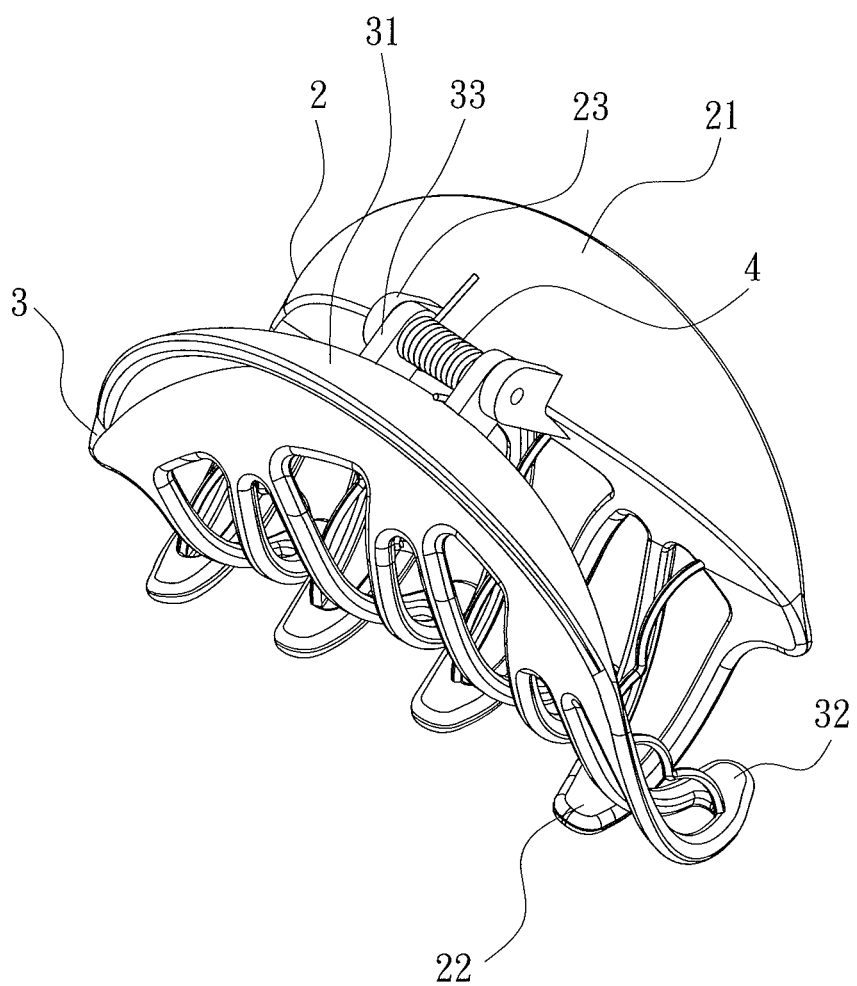
Figure 8:
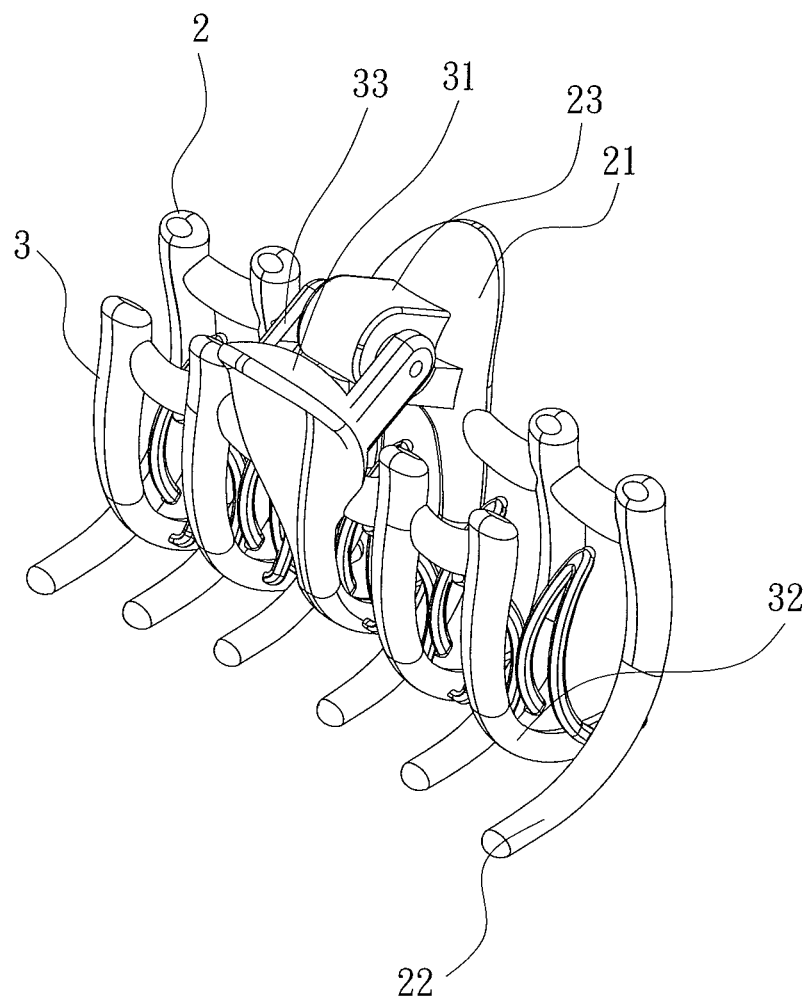

FIG. 6 through FIG. 8 illustrate hair accessories in three other embodiments of the present invention as hair clips. In the three embodiments, the clamp bodies 2, 3 can be designed as other unspecific styles for a hair clip which is available to a user according to her requirements. In the hair clips, the combs 22, 32, bent or deformed, do not induce white crease marks or cracks.

As demonstrated in experimental tests, the hair accessory of the present invention which is made from abovementioned polymerized plastic materials based on the ratios can be fabricated as a one-piece hair hoop or a metal and plastic hair clip, each of them is able to manifest effects of the hair accessory in the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A hair accessory for combing, clamping or fixing hairs consisting of a hair loop with a plurality of serrations at inner side thereof and a thickness of 1.5 mm to 3 mm; said hair loop consisting of a plurality of integrated polymerized plastic materials having a Shore Hardness between 41 D and 60 D, 75% of acrylonitrile-butadiene-styrene resin, 20% of thermoplastic rubber, 1.5% of defoamer, 1.5% of lubricant and 2% of optical brightener with 5% tolerance for each individual ingredient respectively, wherein said hair loop provides flexibility, rebound elasticity and plasticity with no white crease marks, cracks when the accessory is bent or deformed.

2. A hair accessory for combing, clamping or fixing hairs consisting of a hair clip with two clamping bodies, wherein each of said two clamping bodies including a pressing portion bending outward and a plurality of curved combs formed on a bottom of said pressing portion; two pivoting portions formed on inner surfaces of said two clamping bodies respectively and hinged together by a spring;

said hair clip consisting of a plurality of integrated polymerized plastic materials having a Shore Hardness between 41 D and 60 D, 75% of acrylonitrile-butadiene-styrene resin, 20% of thermoplastic rubber, 1.5% of defoamer, 1.5% of lubricant and 2% of optical brightener with 5% tolerance for each individual ingredient respectively, wherein said hair clip provides flexibility, rebound elasticity and plasticity with no white crease marks, cracks when the accessory is bent or deformed.

* * * * *